United States Patent [19]
Greenberg et al.

[11] 3,843,295
[45] Oct. 22, 1974

[54] INJECTION MOLDING MACHINE WITH ADJUSTABLE NOZZLE LENGTH MEANS

[75] Inventors: Walter H. Greenberg, Syosett; Frank J. Nussbaum, New York, both of N.Y.

[73] Assignee: Bischoff Chemical Corporation, Hicksville, N.Y.

[22] Filed: May 24, 1973

[21] Appl. No.: 363,618

[52] U.S. Cl.................. 425/248, 141/368, 425/250
[51] Int. Cl............................................. B29g 3/00
[58] Field of Search ........... 425/242, 247, 248, 250; 141/368

[56] References Cited
UNITED STATES PATENTS

| | | | |
|---|---|---|---|
| 3,023,458 | 3/1962 | Seymour | 425/247 X |
| 3,436,446 | 4/1969 | Angell | 425/242 X |
| 3,442,306 | 5/1969 | DeRose | 141/368 |

Primary Examiner—Robert D. Baldwin
Attorney, Agent, or Firm—Jackson, Jackson & Chovanes

[57] ABSTRACT

Split molds are mounted upon a plurality of platens having parallel faces reciprocating within the reciprocating linear movement of clamping means in an injection molding machine. Each mold cavity is filled through one or more nozzles extending from a fixed manifold portion of the machine, each nozzle having a tip at least intermittently fitting against a nozzle seat. Length adjustment means are provided for each nozzle, whereby the molding machine is operable at a plurality of temperatures, while still having a reciprocatingly retractable leakproof fit between certain nozzle tips and their nozzle seats.

4 Claims, 7 Drawing Figures

INJECTION MOLDING MACHINE WITH ADJUSTABLE NOZZLE LENGTH MEANS

FIELD OF INVENTION

This invention relates to injection molding machines for molding organic resinous polymeric plastic material into cavities of a plurality of stacked molds maintained under pressure by a common clamping means.

PRIOR ART

Rees U.S. Pat. No. 3,659,997 describes an injection molding machine having a plurality of horizontally stacked split molds having transverse feed means for injection material at the edges of the molds. Angell U.S. Pat. No. 3,436,446 describes a molding machine in which a mixture of molten plastic and gas is directed from a nozzle into a cavity of a split mold within a linearly reciprocating clamp, the single nozzle tip being continuously fitting against its seat in a fixed portion of the mold. After expansion of the composition within the mold cavity and cooling, an article featuring the combination of a cellular core and a relatively high density skin can be removed from the opened mold. After expansion of the composition within the mold cavity and cooling, an article featuring the combination of a cellular core and a relatively high density skin can be removed from the opened mold. Numerous advantages arise because, in apparatus for conducting the Angell method, the hot plastic flows into the cavity in an axial direction parallel to the direction of the axis of the linear reciprocation of the split mold, as distinguished from the disadvantages attributable to the transverse flow of hot plastic into the mold cavity in the Rees apparatus. Notwithstanding the long standing demand for a molding machine having the advantage of axially aligned nozzles and stacked molds, no satisfactory answer to the long standing demand for such a machine and method was available.

SUMMARY OF THE INVENTION

The present invention is concerned with a mchine for injection molding of polymeric organic material, said machine comprising a frame, linear clamping means comprising a fixed portion secured to the frame and moving component reciprocating linearly between a closed position and an open position, at least one split mold comprising a mold component having reciprocating linear movement in the same direction as the clamping means, and means for directing pressurized hot organic polymeric plastic material into a mold cavity for conversion into an article removeable from the mold at the end of the molding cycle. The present invention includes the improvement in such a machine which consists of the combination of a plurality of split molds whereby the closed clamping means applies pressure to a plurality of molds, nozzles extending from a fixed zone of the frame to mold components, nozzle seats on selected moveable components of the molds, said nozzle seats having orifices and said nozzle seats being adapted to fit against the tips of the nozzles whereby hot organic plastic material flows through orifices in the nozzle seats for filling each mold cavity, and adjustable means on each nozzle, whereby the position of each nozzle can be adjusted to assure an appropriate pressure between the nozzle tip and nozzle seat while a mold is closed, notwithstanding operation of the molding machine at different times at temperatures different enough that thermal expansion of the length of the nozzle throughout such temperature difference could account for inoperatively different pressures between the nozzle tip and nozzle seat in the absence of such nozzle position adjustment means.

Also contemplated within the scope of the present invention is a method for injection molding of heat formable resins, the steps of the method comprising providing a plurality of molds positioned generally in a parallel planes, providing means to clamp said molds, at least a portion of said molds adapted to move along the axis of linear clamping, the molds having a plurality of filling passageways, the filling passageways being at least partially disposed along the axis of clamping, moving said molds along the axis of clamping so that a plurality of molds are closed within such clamping means, adding hot organic polymeric plastic material to said molds through said passageways, said passageways being within the region encompassed by said linear clamping means, cooling the plurality of articles in the plurality of molds within the closed clamping means, and removing the plurality of articles from the plurality of molds after the opening of said clamping means.

The method and apparatus of the present invention can be used with any heat formable synthetic polymeric organic resin and are used with particular benefit with resinous materials which can be heated to a plastic condition. Particularly beneficial in the practice of the present invention are expandable or foamable plastics. Such expandable or foamable plastics are those which, when forced to flow from a pressurized zone (e.g., extrusion) into a region of lower pressure such as atmospheric pressure, expand to form a plurality of gas-containing cells. Such expandable synthetic resinous compositions are sufficiently well known to require no further description.

In certain embodiments, a plurality of floating platens reciprocate within the clamping means. Mold components are attached to the platens so that a plurality of split molds are openable and closeable by the opening and closing of the linearly reciprocating clamping means. Each nozzle tip is adapted to be fitted against a nozzle seat with a regulated amount of pressure, whereby a leakproof connection between such nozzle seat in a reciprocating component of the mold and the tip of a nozzle is maintained when the reciprocating component is shifted to a mold closing position and whereby propensities to bend or distort mold and/or machine components are avoided. Each nozzle has length adjustment means adapted to permit the pressure between the nozzle tip and the nozzle seat to be within an operable range throughout the entire range of operating temperatures. Various machine components, and particularly the nozzles undergo significant thermal contraction or expansion between the upper and lower operating temperatures. In the absence of such length adjustment means, there are significant propensities to bend, distort, or otherwise damage mold and/or machine components, and/or propensities for leaking association between the nozzle tips and nozzle seats by reason of such thermal expansion or contraction of the nozzles. Moreover, mold design tolerances are more manageable by reason of the adjustability of nozzle lengths.

In certain embodiments, a mixture of gas and molten plastic is employed for filling the mold.

DESCRIPTION OF EMBODIMENTS

Figure 1:
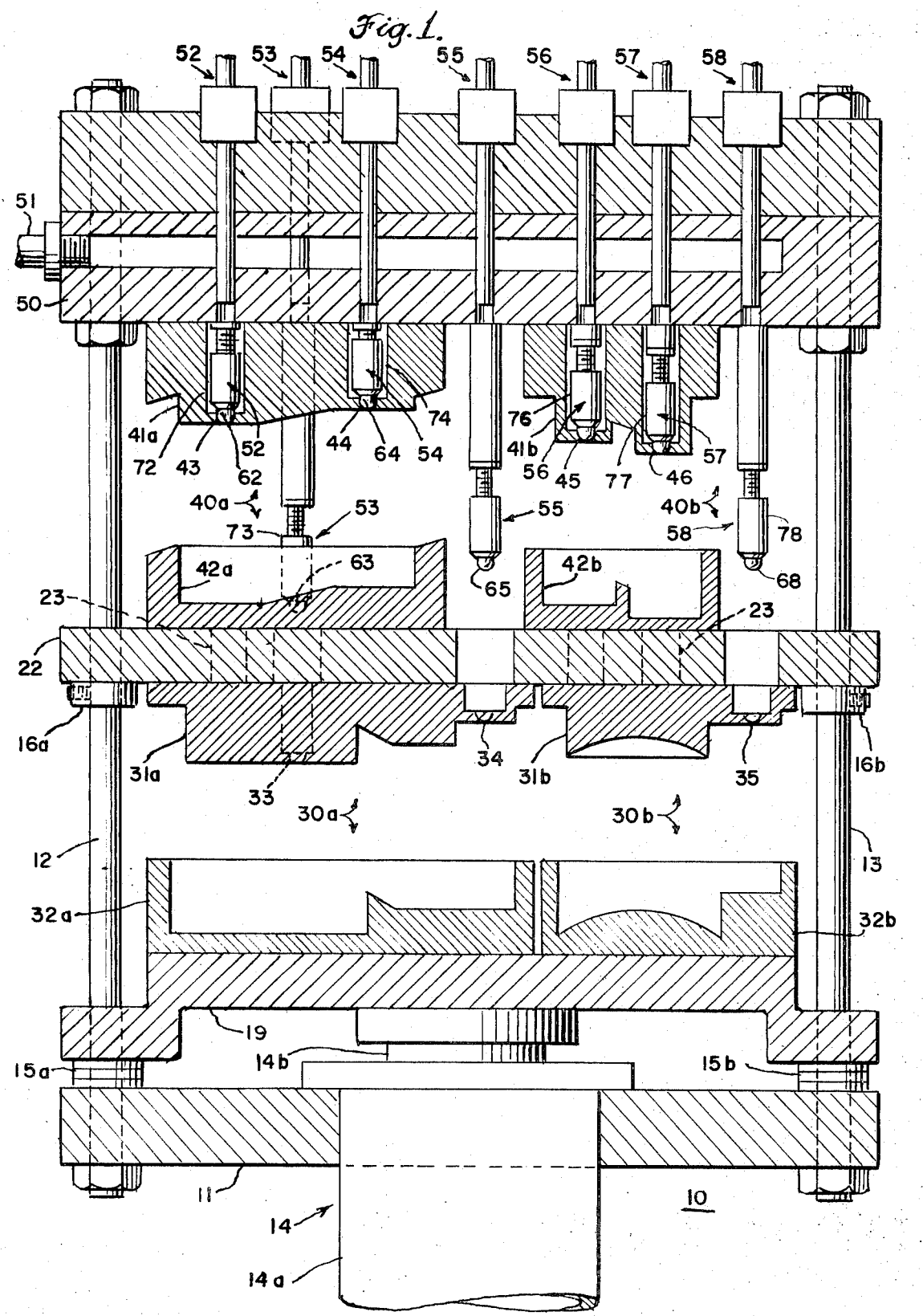
FIG. 1 is a schematic sectional elevational view of an embodiment of a molding machine in accordance with the invention.
Figure 2:
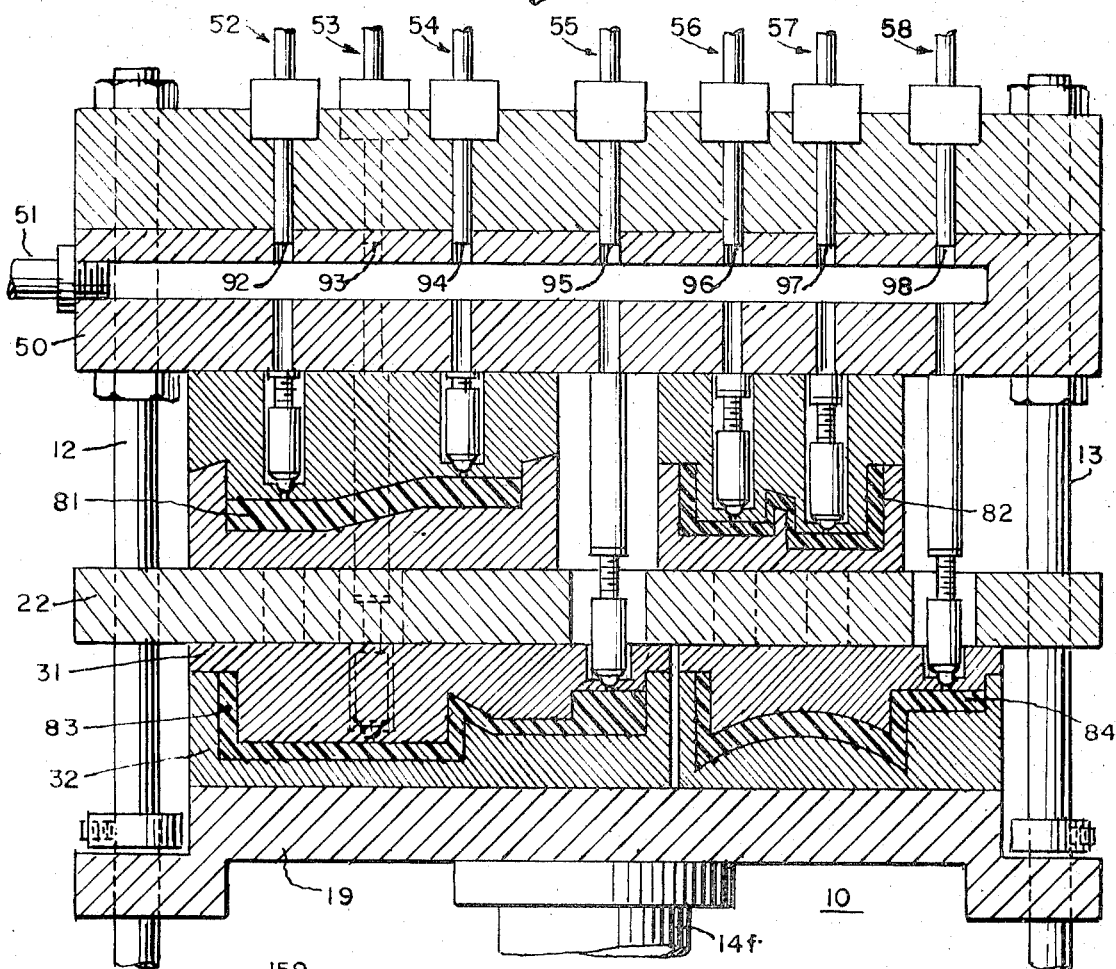
FIG. 2 is a schematic view of the apparatus of FIG. 1 when plastic articles are formed in the various closed mold cavities.

Referring to FIGS. 1 and 2, a molding machine 10 includes a base 11 and a plurality of supporting vertical posts 12, 13. A clamping means 14 including a hydraulic cylinder 14a, piston 14b, and associated reciprocating means can be actuated upwardly by the hydraulic cylinder 14a to apply pressure within a clamping zone of the molding machine, but is shown in the open position. Powered platen 19 can be actuated upwardly when the clamping means goes through its programming for upward movement, slowing down as floating platen 22 becomes an additional component moved upwardly by the clamping means and rising more rapidly between stages. The rectangular faces of a powered platen 19 and floating platen 22 are parallel and only the thickness across the width of such platens shows in FIGS. 1 and 2. The molding machine 10, each platen 19 and 22, and other components each has a significant length recognized by molding machine technologists, but sufficiently conventional that sectional views adequately illustrate the invention. Limiting blocks 16a, 16b restrict the downward gravitational movement of floating platen 19. Such limiting blocks can be adjustably clamped to vertical posts 12 and 13. Rectangular floating platen 22 has a plurality of openings 23 adapted to permit passage therethrough of an array of nozzles for lower molds but only a few of such openings are shown in FIG. 1.

A split mold 30a comprising a female portion of a contoured wall 32a is secured to the top of powered platen 19 and male portion of a contoured wall 31a is secured to the bottom of floating platen 22. A mold cavity is defined by such split mold portions when the mold is closed as shown in FIG. 2. Similarly a split mold 30b has a cavity defined by components 31b and 32b of mold 32b similarly secured to platens 19, 22. In the embodiment of FIGS. 1 and 2, such molds 30a and 30b can be treated as remote molds because they are a significant distance from the fixed portion of the nozzles. Nozzle seats 33, 34, 35 in contoured walls 31a and 31b provide openings through which the mold cavities can be filled during a programmed portion of the closed mold segment of the molding cycle.

Upper split molds 40a and 40b include male contoured walls 41a and 41b and female contoured walls 42a and 42b defining suitable cavities. Nozzle seats 43, 44, 45, 46 in contoured walls 41a and 41i b are designed to accomodate the tips of nozzles. Contoured walls 42a and 42b are secured to the top of floating platen 22. Contoured walls 41a and 41b are secured to the bottom of a fixed support 50. The base 11, posts 12, 13 and fixed support 50 can be deemed to be a frame of molding machine 10. The molds 40a and 40b can be designated as nearby or upper molds to distinguish them from remote or lower molds 30a, 30b in the vertically reciprocating embodiment of FIGS. 1 and 2.

Pressurized molten plastic resin is directed to the molding machine in accordance with any suitable injection molding practice and is deemed schematically to flow through a manifold system comprising conduit 51 to each nozzle of a suitable array of nozzle systems 52, 53, 54, 55, 56, 57 and 58. Each nozzle system includes a nozzle tip 62 – 68 adapted to engagement in nozzle seats 43 – 46, 33 – 35. It is customary to provide in the rectangular fixed support 50 a plurality of parallel manifolds 51 having openings at which nozzles can be attached as needed. Although the several manifolds may have openings arranged in an orthogonal gridiron pattern, only a relatively few nozzles are ordinarily employed, and shields are positioned at the unused openings. Nozzle 53 is shown connected to manifold more remote than the manifold shown in cross section. The securing of nozzles to manifolds complies with prior practices and requires no detailed description.

It should be especially noted that collar portions 72 – 78 are threadably adjustable, so that the length of each nozzle system 62 – 68 can be adjusted to assure a leakproof fit between a nozzle tip and its seat when the mold is closed. When a low melting plastic is employed, the molding machine is maintained at a temperature several hundred degrees cooler than when a high melting plastic is used. The length of the nozzle system 55 is great enough that if the nozzle were adjusted for high temperature operation, and then cooled to the temperature of a low melting plastic, the shortening of the nozzle attributable to the temperature difference could cause a gap of sufficient magnitude to permit the escape of hot molten plastic between the nozzle tip 65 and nozzle seat 34. If nozzle 58 were adjusted for warm temperature and used at a hot temperature, the pressure of the clamping means 14 could lead to bending or distortion of the nozzle, mold, or other machine components. Because threaded collar portions are adjustable, the length of a nozzle can be adjusted to be suitable for a contemplated temperature of operation, thus avoiding either the hazard of bent components or the hazard of a leaking gap between a nozzle tip and its seat. Moreover, design and fabrication of orifices in the mold are more manageable when the nozzle systems have adjustable lengths.

The nozzle seat 34 is reciprocatingly retractable from the nozzle tip 65. When the mold is closed by linear clamping means 14, the nozzle seat 34 is fitted against the nozzle tip 65 in such a manner as to assure a leakproof joint but without any excessive pressure tending to distort machine components. In the absence of means for adjusting the length of the nozzle systems 55, differences of temperature between the peak temperature for molding and the minimum temperature of molding could account either for gaps which would prevent the seating from being leakproof or pressures tending to bend or distort machine components such as molds or nozzles.

The design of molds can be more flexible when a nozzle system has length adjustability. Hence the length adjustability is advantageous even for the nozzle system 52 secured to the stationary contoured face 41.

In the operation of the machine, the method includes the steps of shifting the powered platen to close the split molds, directing the hot molten material into a distribution system comprising conduit 51 and thence to a plurality of nozzles, allowing the hot molten material to flow through the nozzles into each of the closed mold cavities during a portion of the molding cycle, cooling the articles thus formed within the mold, and opening the two halves of each of the molds by releasing the clamping pressure and shifting the reciprocatable platens to their open position, and removing the articles from the thus opened molds, and then closing the molds in preparation for repeating the cycle. In closing the molds, contoured walls on the reciprocatable platens are shifted from a remote location into a fit with other portions of the split molds. The present invention is particularly concerned with the reliability of securing an appropriate fit between nozzle tips and nozzle seats by providing for length adjustability for each of the nozzles, whereby nozzle bending is prevented and whereby leakproofness is assured when the clamping means applies the pressure effective in maintaining the split mold components in leakproof relation. During the filling of the mold, the stream of molten plastic entering the mold cavity exerts an impingement pressure tending to open the mold, and the clamping means 14 is effective in maintaining each pair of split mold components together in leakproof relationship both during the filling and during the cooling of the filled molds. The pressure within each mold during the cooling of the article in the mold is relatively low (e.g., 250 psig.) when a cellular article is made from a mixture of gas and molten plastic. Conventional injection molding generally involves higher pressures (e.g. 15,000 psig.) during the cooling of the article in the mold.

It has been previously explained that the molding machine 10 has facilities for detachably securing nozzles at manifold positions corresponding to an orthogonal grid pattern of the rectangular panels of the fixed member 50, and that an array of nozzles is positioned at manifold openings adapted to meet the needs of the molds employed. The nozzles selected to go to the remote nozzle seats are chosen to avoid interference with the nearby molds.

Particular advantages are achieved in employing the apparatus for molding structural foam articles of a type somewhat similar to those described in Angell U.S. Pat. No. 3,436,446 but significantly larger by an order of magnitude. Production of an article having a larger cross sectional area requires clamping means which are much more costly. It is advantageous to make multiple use of such costly clamping means by utilizing a plurality of stacked molds (secured to multiple platens) between the clamping members. During prolonged operation, many portions of the mold are hotter than ambient temperature, but an especially hot temperature is attained by the melt feed system, including the nozzle systems. Thermal expansion of the nozzle thus tends to be significantly different from thermal expansion of some other portions of the machine. All machines for conducting the process of Angell U.S. Pat. No. 3,436,446 have heretofore maintained constant contact between the nozzle tip and the nozzle seat of the contoured wall. Surprizingly, the present invention establishes the operability of a reciprocatingly retractable fit between the nozzle tip and nozzle seat in apparatus for conducting a process of injection molding. Such retractable fit of nozzle tip and nozzle seat in an injection molding process is advantageous when there is adjustability of the length of the nozzle. Such invention is particularly advantageous in a process of the type of Angell U.S. Pat. No. 3,436,446.

Figure 3:
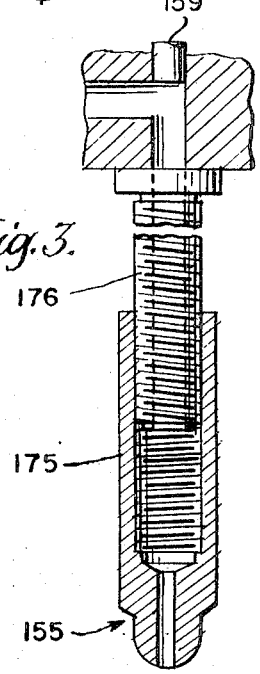
FIG. 3 is an enlarged detailed cross section of a nozzle adapted to be adjusted in length by means of a threaded nozzle tip.
Figure 4:
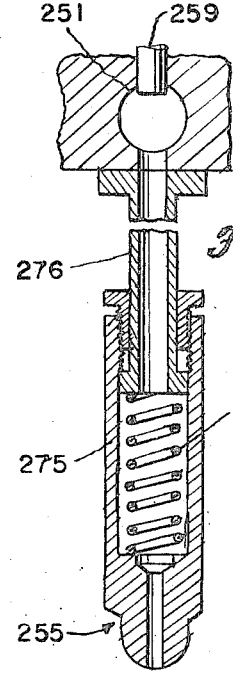
FIG. 4 is a cross sectional view of a nozzle having a spring loaded tip.
Figure 5:
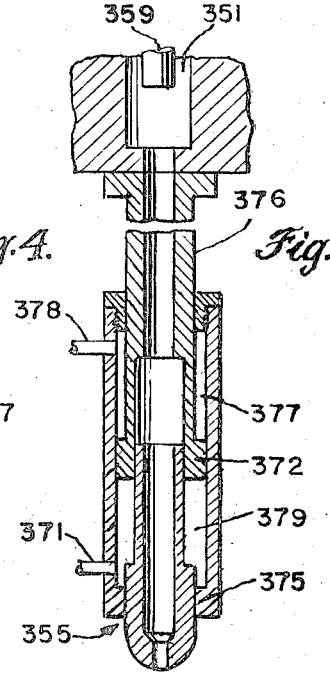
FIG. 5 is a schematic view of a nozzle having fluid pressure means for adjusting nozzle length.

As shown in FIG. 3, the length adjustability of a nozzle 155 can be achieved by threaded interengagement between two portions 175, 176 of a nozzle corresponding to what might be used for any of the nozzles in the molding machine 10. Just as nozzle 155 resembles nozzle 55, the suitability of other components can generally identified by the last two digits, and hundreds can permit different species to be used where convenient. As shown schematically in FIG. 4 length adjustability of a nozzle 255 can be achieved by springloaded portions 275, 276, this arrangement tending to urge the nozzle tip to maximum length except as restrained by the clamping means 14 and transmitted to the nozzle tips by fitting against the nozzle seats. As shown in FIG. 5, two components 375, 376 of nozzle 355 respond to the fluid pressure of zones 377 and 379, separated by barrier 372. The length of nozzle 355 can be adusted in response to the fluid pressure supplied by lines 371 and 378 to zones 379 and 377 respectively.

Figure 6:
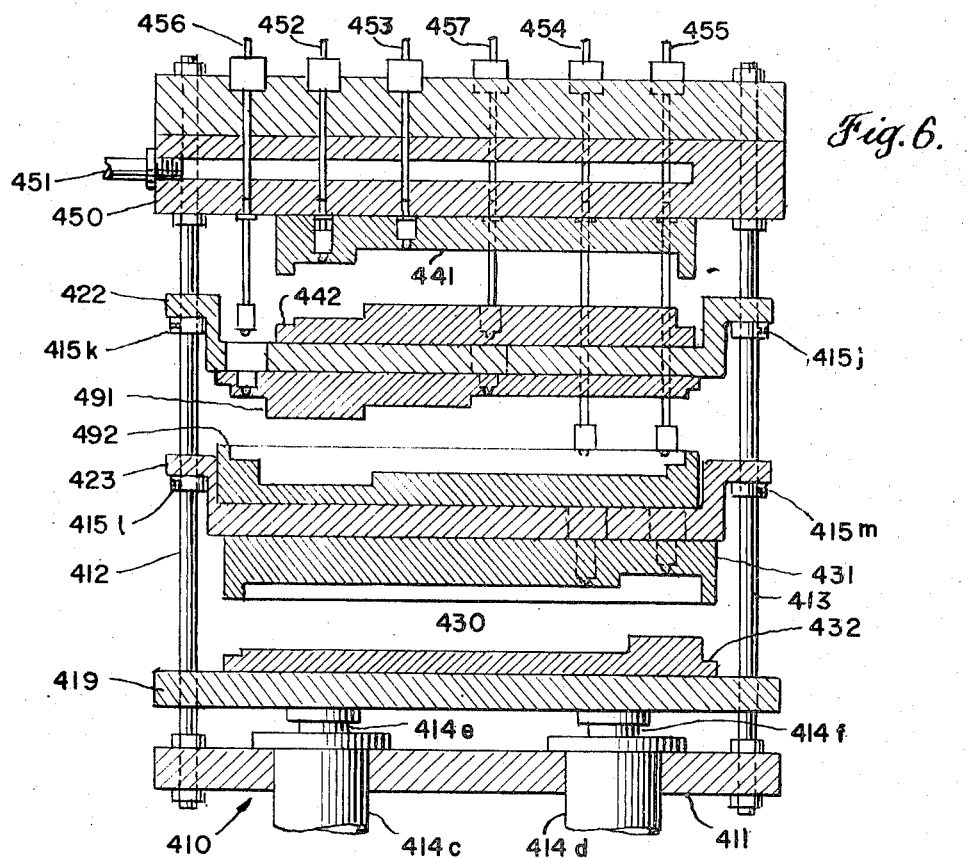
FIG. 6 is a view similar to FIG. 1, but illustrating a molding machine having two floating platens and a powered platen carrying mold parts.

More than one floating platen is sometimes advantageously employed in efforts to maximize the productivity of a machine having a given clamping pressure. As shown in FIG. 6, a molding machine 410 include a base 411, posts 412, 413, and a clamping means 414 comprising two cylinders 414c and 414d actuating two pistons 414e and 414f. Two floating platens 422, 423 can be lowered to rest on limiting blocks 415j, 415k, 415-l, and 415m. Movable platen 419 is powered by pistons 414e and 414f. Molds 430, 440, 490 are reciprocatingly opened and closed similarly to the operation of machine 10. Several rows of positions at which nozzles might be positioned are employed, so that some nozzles are located several rows back of the row shown in cross section.

Any suitable fitting between nozzle tip and nozzle seat, such as conical fits, spherical fits, etc., may be employed. The nozzles are fitted so that the several parallel conduits 451 in fixed panel 450 supply hot molten plastic to each of the array of nozzles. The split molds for the present invention do not require parting lines parallel to the floating platen.

Each nozzle includes a nozzle rod. An end face 92 of a nozzle rod can advance to serve as a part of mold wall 41a. Such use of an end face of a nozzle rod for sprueless molding is sometimes appropriate, but molding with sprues is also feasible by the present invention. As shown in FIGS. 3–5, nozzle rods 159, 259 and 359 can be retracted sufficiently to permit molten plastic to flow from a manifold zone 51 to a nozzle orifice at the nozzle tip. Nozzle mounting can be either of the fixed type or self-aligning arrangement such as shown in Voelker U.S. Pat. No. 3,512,216, assigned to Bischoff Chemical Corporation.

Figure 7:
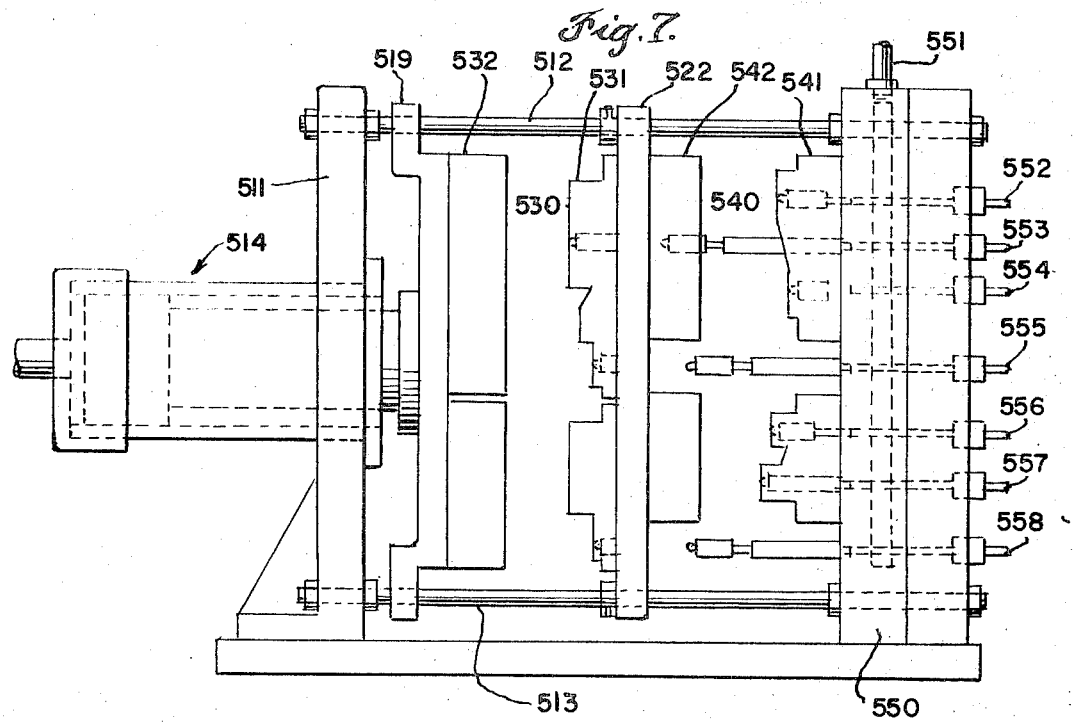
FIG. 7 is a schematic showing of a modification in which the platnes are disposed vertically instead of horizontally.

Instead of a vertically reciprocating molding machine, a horizontally reciprocating molding machine is also feasible. FIG. 7 schematically shows such a machine having two split molds 530, 540 positioned for closing by clamping means 514.

It should be noted that the system for distribution of molten plastic to the plurality of nozzles may feature the teachings of Nussbaum U.S. Pat. No. 3,543,348, assigned to Bischoff Chemical Corporation.

A pair of panel members designed to be matched components fitting together can be advantageously prepared in a mold machine having a parallel pair of split molds. After assembly, the fitted matched units can be handled more conveniently than the separate panels. The method of molding matched components in the twin mold, assembling the components promptly after removal from the mold, and handling the thus assembled unit offers significant advantages over methods involving significant handling of unassembled components. Of particular importance, the substantially simultaneous molding of the two components provides more perfect matching of the two components than would otherwise be attainable, by minimizing differences in some of the molding variables. Reference is made to Greenberg and Nussbaum Ser. No. 264,516, filed June 20, 1972, all the disclosure of which is deemed here reiterated. The machine of the present invention is advantageous in producing the matched panels of said Ser. No. 264,516. Not only is the capital and operating cost for the clamping means significantly less than would be required in a machine having two panel molds beside each other, but also the floor space for the machine is significantly less.

Although it is usually desirable to secure molds to reciprocating platens, a plurality of stacked split molds can have components reciprocating within the clamping means without platen members, such molds having sufficient strength to handle the operating forces to which platens are subjected.

Various modifications of the invention are possible without departing from the scope of the claims.

The invention claimed is:

1. In a machine for molding articles of polymeric organic material, said machine comprising a frame, linear clamping means comprising a fixed portion secured to the frame and moving components for reciprocating linear movement between a closed position and an open position, at least one split mold comprising a mold component having reciprocating linear movement in the same direction as the clamping means, and means for directing pressurized hot organic polymeric plastic material into a mold cavity for conversion into an article removable from the mold at the end of the molding cycle, the improvement which consists of the combination of:
   a plurality of stacked split molds whereby the closed clamping means applies pressure to a plurality of molds;
   a manifold system adapted to distribute organic material, said manifold system being secured to a fixed portion of the frame;
   nozzles extending from the manifold system toward mold components;
   nozzle seats on selected movable components of the molds, said nozzle seats having orifices, and said nozzle seats being adapted to fit against the tips of the nozzles whereby hot organic plastic material flows through orifices in the nozzle seats for filling a mold cavity during a programmed portion while the molds are closed, said nozzle seats being reciprocatingly retractable from the nozzle tips during the opening of the molds; and
   adjustable means on each nozzle fitting against a reciprocatingly retractable seat, whereby the length of each such nozzle can be adjusted to assure an appropriate pressure between the nozzle tip and nozzle seat while a mold is closed, notwithstanding operation of the molding machine at different times at temperatures different enough that thermal expansion or contraction of the length of the nozzle throughout such temperature difference could account for troublesomely different pressures between the nozzle tip and nozzle seat in the absence of such nozzle length adjustment means.

2. The molding machine of claim 1 in which a threaded member at the tip provides the adjustability of the length of the nozzle.

3. A molding machine of claim 1 in which a spring-loaded member at the tip provides the adjustability of the length of the nozzle.

4. The molding machine of claim 1 in which platens reciprocate in the same direction as the linear clamping means and in which mold components are secured to such platens.

* * * * *